US011915893B2

(12) United States Patent
Sagara et al.

(10) Patent No.: US 11,915,893 B2
(45) Date of Patent: Feb. 27, 2024

(54) MULTI-DIRECTIONAL OPERATION SWITCH DEVICE

(71) Applicant: Panasonic Intellectual Property Management Co., Ltd., Osaka (JP)

(72) Inventors: Hisashi Sagara, Osaka (JP); Takeshi Miyaoka, Osaka (JP); Hideyuki Murakami, Kanagawa (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 18/156,256

(22) Filed: Jan. 18, 2023

(65) Prior Publication Data

US 2023/0298835 A1 Sep. 21, 2023

(30) Foreign Application Priority Data

Jan. 31, 2022 (JP) ................................. 2022-013112
Aug. 23, 2022 (JP) ................................. 2022-132797

(51) Int. Cl.
*H01H 25/00* (2006.01)
*H01H 25/04* (2006.01)

(52) U.S. Cl.
CPC .......... *H01H 25/002* (2013.01); *H01H 25/04* (2013.01)

(58) Field of Classification Search
CPC ............................ H01H 25/002; H01H 25/04
See application file for complete search history.

(56) References Cited

U.S. PATENT DOCUMENTS

2005/0040018 A1* 2/2005 Gotoh ...................... G05G 1/08 200/17 R
2009/0134003 A1 5/2009 Okidate

FOREIGN PATENT DOCUMENTS

JP 2009129871 A 6/2009

* cited by examiner

*Primary Examiner* — Yaron Cohen
(74) *Attorney, Agent, or Firm* — Seed IP Law Group LLP

(57) ABSTRACT

A multi-directional operation switch device that can smoothly move a slider that is movable in four directions back to a neutral position is provided. The multi-directional operation switch device includes: a slider movable in the four directions; four push switches provided in the four directions to detect a movement of the slider; and four pressing members provided between the slider and the push switches. The slider includes four side face portions, each intersecting a first axis or a second axis, each axis extending in at least one of the four directions. Each side face portion includes a sloped region sloped toward a center of the slider. The push switches include movable portions, each movable portion self-returning and moving to an original position when pressing is released. Each pressing member is in contact with a corresponding one of the movable portions and a corresponding one of the side face portions.

20 Claims, 9 Drawing Sheets

MULTI-DIRECTIONAL OPERATION SWITCH DEVICE

CROSS REFERENCE TO RELATED APPLICATIONS

The present application is based on and claims priority of Japanese Patent Application No. 2022-013112 filed on Jan. 31, 2022, and Japanese Patent Application No. 2022-132797 filed on Aug. 23, 2022.

FIELD

The present disclosure relates to a multi-directional operation switch device that is slidable in multiple directions.

BACKGROUND

Conventionally, a multi-directional operation switch device that is slidable in multiple directions has been known. Patent Literature (PTL) 1 discloses a multi-directional operation switch device including: a pad that is movable in multiple directions; a support pin that is in contact with the pad; and a spring that presses the support pin in the axis direction. The pad includes a mortar-shaped pin receiving portion, and the leading end of the support pin is in contact with the pin receiving portion. In the multi-directional operation switch device, the support pin presses the mortar-shaped pin receiving portion by utilizing the force of the spring, and the pad is moved back to a neutral position.

CITATION LIST

Patent Literature

PTL 1: Japanese Unexamined Patent Application Publication No. 2009-129871

SUMMARY

However, the multi-directional operation switch device according to PTL 1 can be improved upon.

The multi-directional operation switch device according to one aspect of the present disclosure is a multi-directional operation switch device that is slidable in four directions, the multi-directional operation switch device including: a slider that is movable in the four directions; four push switches that are provided in one-to-one correspondence with the four directions to detect a movement of the slider; and four pressing members that are each provided between the slider and a corresponding one of the four push switches, wherein the slider includes four side face portions, each side face portion intersecting a first axis or a second axis, the first axis and the second axis each extending in at least one of the four directions, each of the four side face portions includes a sloped region that is sloped toward a center of the slider, the four push switches include movable portions that are provided in one-to-one correspondence, each movable portion self-returning and moving to an original position of the movable portion when pressing is released, and each of the four pressing members is in contact with a corresponding one of the movable portions and a corresponding one of the four side face portions.

According to the present disclosure, the multi-directional operation switch device of the related art can be improved upon.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Hereinafter, an embodiment will be described specifically with reference to the drawings.

Note that the embodiment described below shows a preferred specific example of the present disclosure. The numerical values, shapes, materials, structural elements, the arrangement and connection of the structural elements, steps, the order of the steps, and the like shown in the following embodiment are merely examples, and therefore are not intended to limit the scope of the present disclosure. Also, among the structural elements described in the following embodiment, structural elements not recited in any one of the independent claims are described as arbitrary structural elements. Also, in the specification of the present application, the terms that describe the relationship between elements such as “same” and “parallel”, the terms that describe the shape of elements such as “rectangular shape” and “circular shape”, and numerical values are expressions that not only have a strict meaning but also encompass a substantially equal range, for example, a margin of about several percent (for example, about 10%).

Embodiment

[Schematic Configuration of Multi-Directional Operation Switch Device]

A schematic configuration of a multi-directional operation switch device according to an embodiment will be described with reference to FIGS. 1 to 5.

Figure 1:
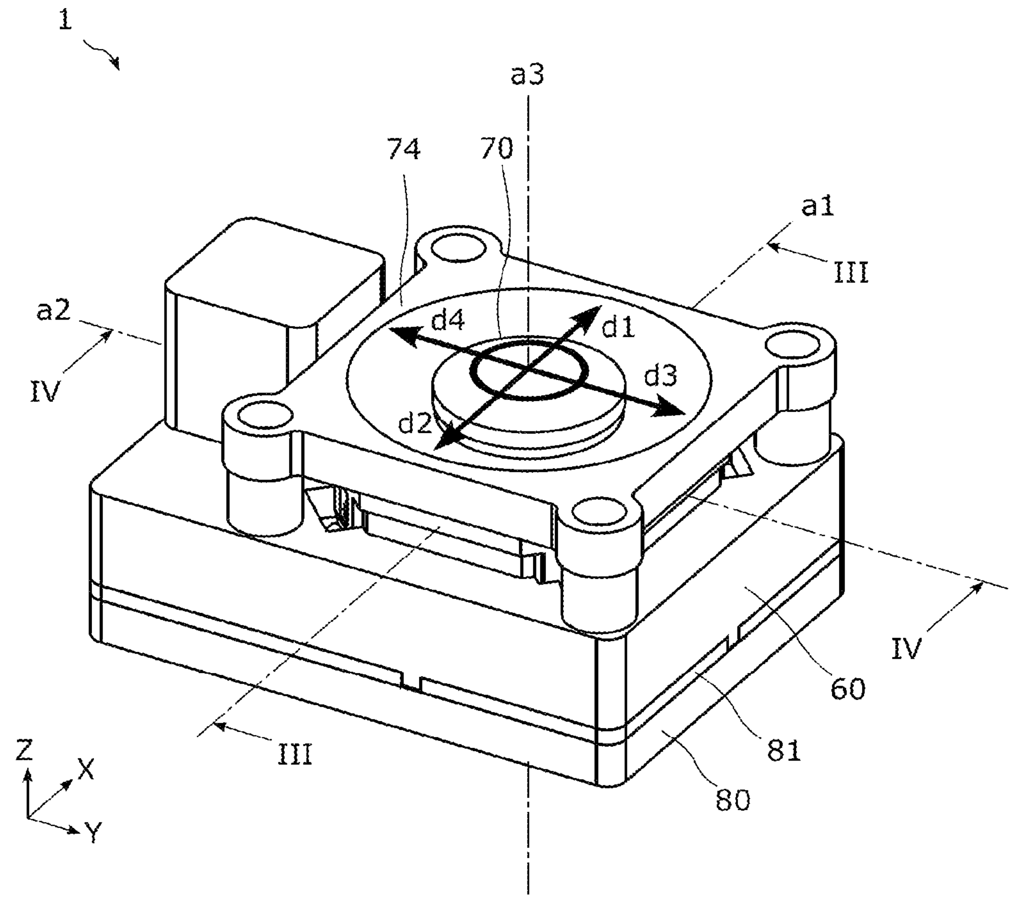
FIG. 1 is an external perspective view of a multi-directional operation switch device according to an embodiment.
Figure 2:
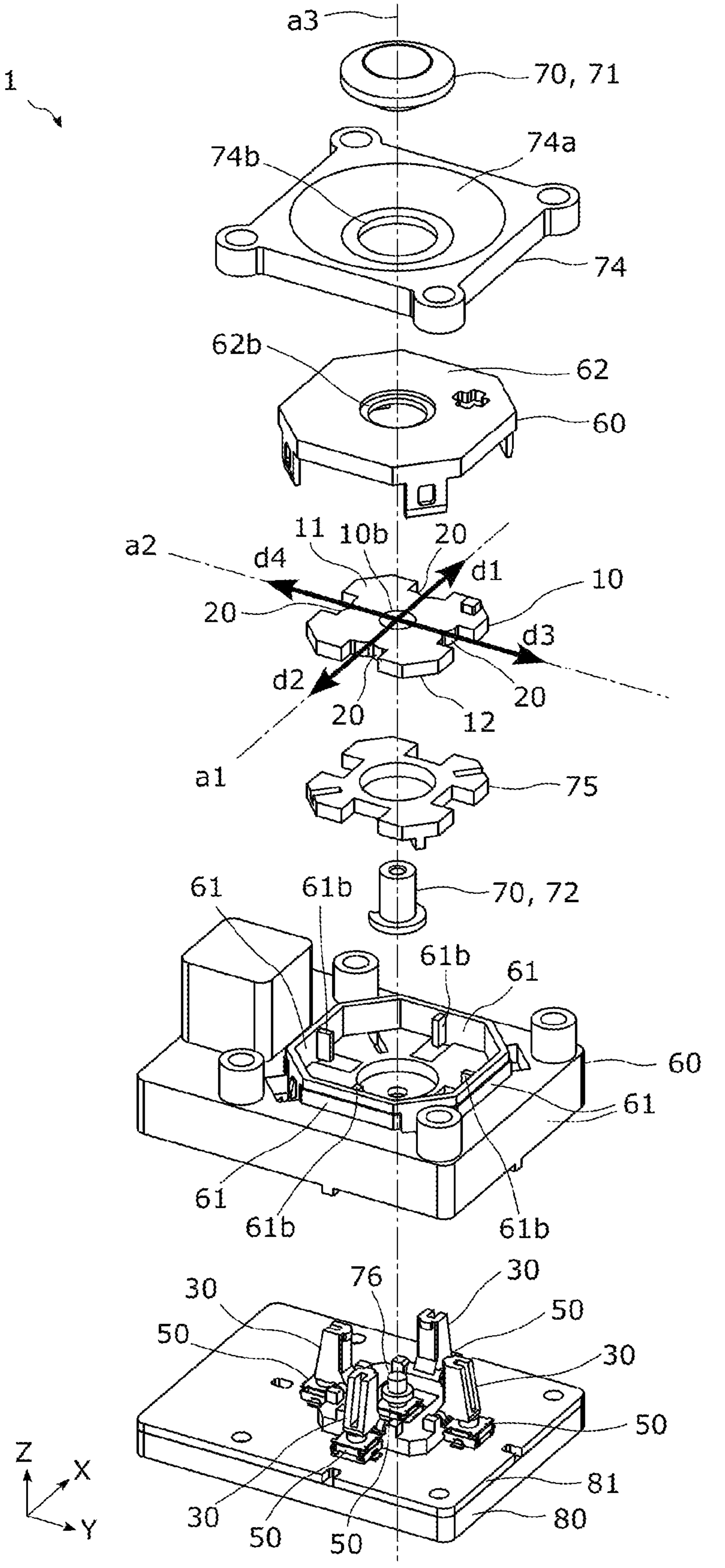
FIG. 2 is an exploded perspective view of the multi-directional operation switch device according to the embodiment.
Figure 3:
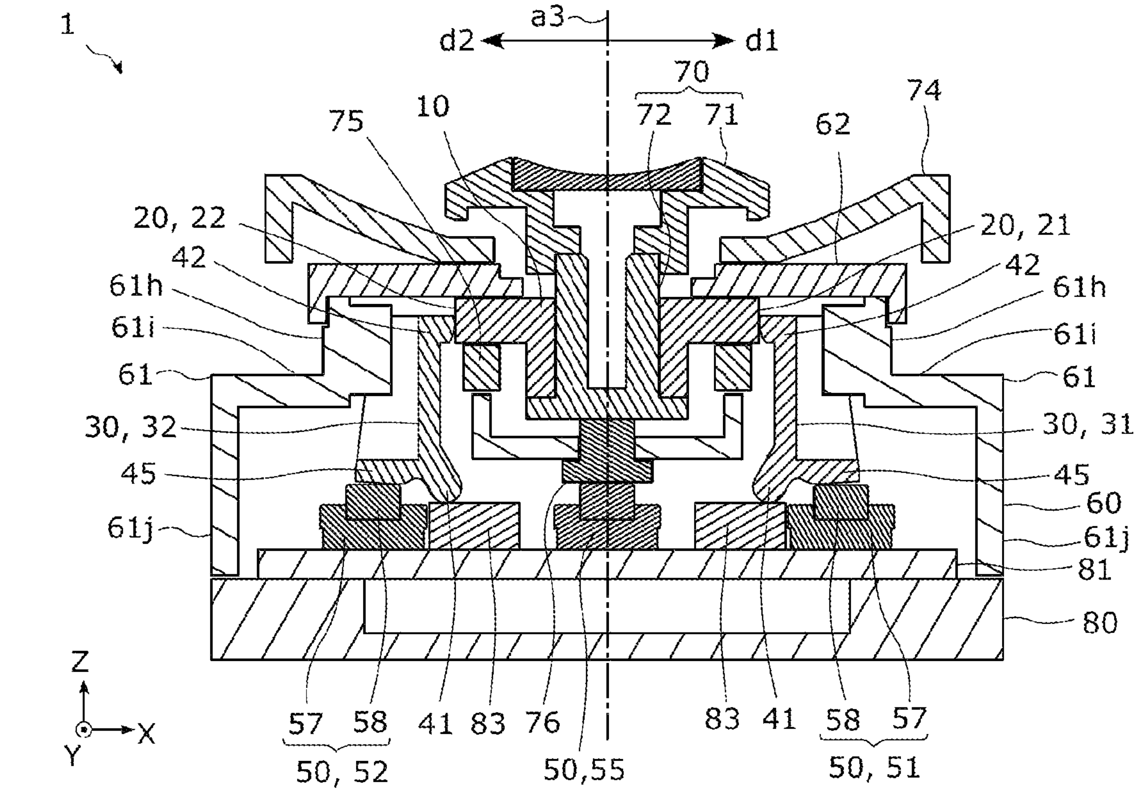
FIG. 3 shows a cross section of the multi-directional operation switch device according to the embodiment, taken along the line III-III shown in FIG. 1.
Figure 4:
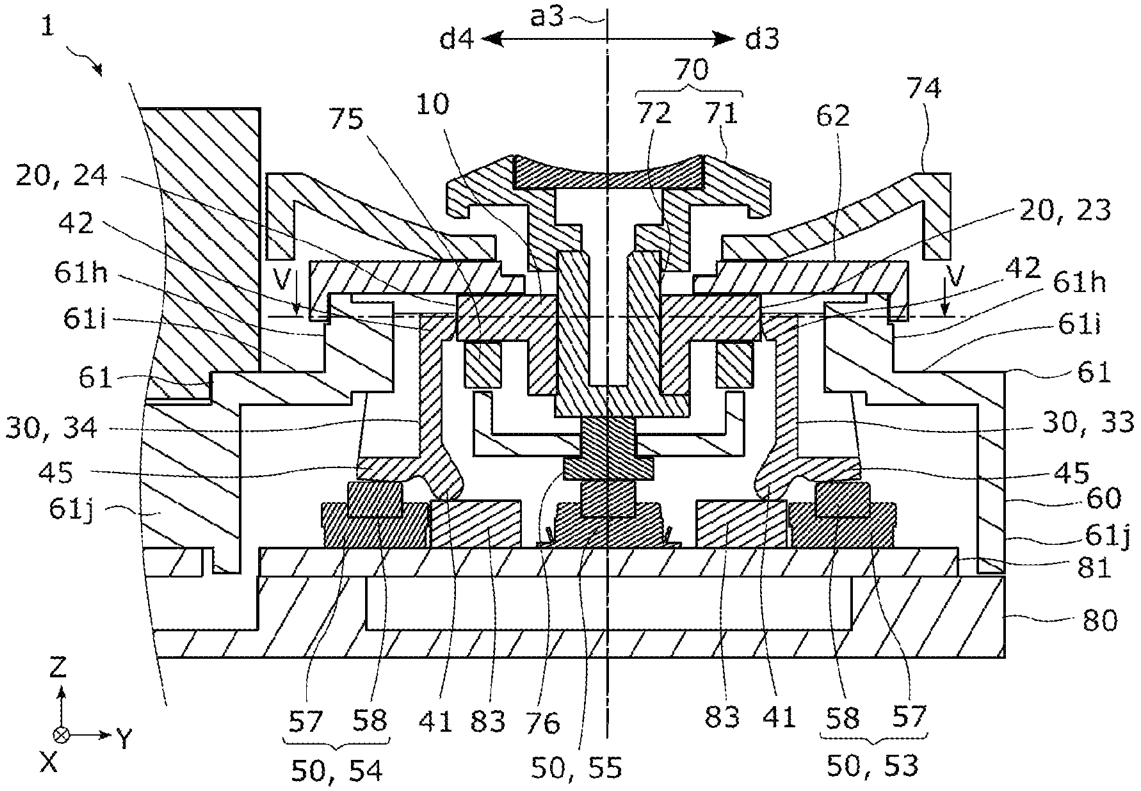
FIG. 4 shows a cross section of the multi-directional operation switch device according to the embodiment, taken along the line IV-IV shown in FIG. 1.
Figure 5:
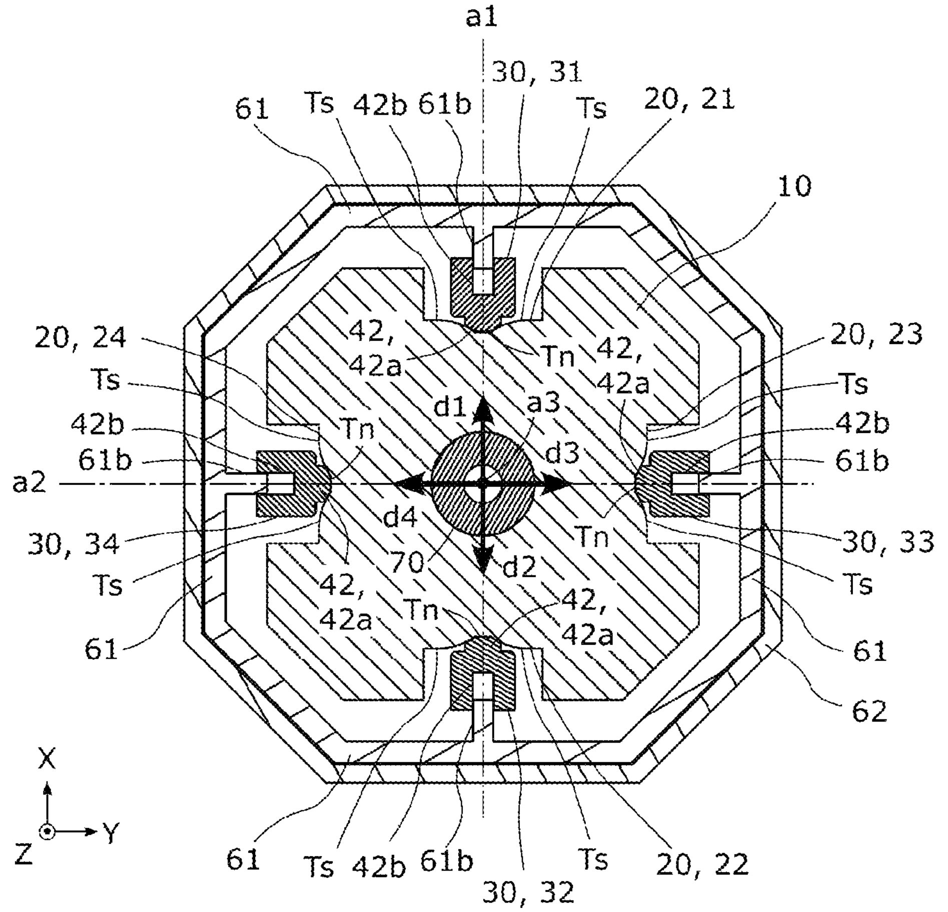
FIG. 5 shows a cross section of a slider, pressing members, and a casing of the multi-directional operation switch device according to the embodiment, taken along the line V-V shown in FIG. 4.

FIG. 1 is an external perspective view of multi-directional operation switch device 1 according to an embodiment. FIG. 2 is an exploded perspective view of multi-directional operation switch device 1. FIG. 3 shows a cross section of multi-directional operation switch device 1, taken along the line III-III shown in FIG. 1. FIG. 4 shows a cross section of multi-directional operation switch device 1, taken along the line IV-IV shown in FIG. 1. FIG. 5 shows a cross section of multi-directional slider 10, pressing members 30, and casing 60 of operation switch device 1, taken along the line V-V shown in FIG. 4.

In FIGS. 1 to 10 that will be referred to in the description of the embodiment given below, coordinate axes are shown. The Z axis indicates a stack direction in which structural elements of multi-directional operation switch device 1 are stacked (for example, a direction that extends in the axis direction of operational member 70 when slider 10 is in a neutral position). The X axis direction and the Y axis direction are directions that are orthogonal to each other on a plane perpendicular to the Z axis direction.

Multi-directional operation switch device 1 shown in FIG. 1 is a switch device that is slidable in four directions. Multi-directional operation switch device 1 is a switch device that is provided, for example, in the steering wheel of a vehicle. Multi-directional operation switch device 1 operates an in-vehicle device according to user's (driver's) operation. The vehicle is, for example, an automobile such as a passenger car, a bus, or a truck.

As shown in FIGS. 2 to 5, multi-directional operation switch device 1 includes: slider 10 that is movable in four directions; four push switches 50 that are provided in the four directions, respectively, to detect a movement of slider 10; and four pressing members 30 that are provided between slider 10 and four push switches 50. As shown in FIG. 5, slider 10 includes four side face portions 20.

In multi-directional operation switch device 1, slider 10 moves based on an operation input from the outside, and a force generated by the movement of slider 10 is transmitted to push switches 50 via pressing members 30, and push switches 50 are thereby switched to ON or OFF. Also, in multi-directional operation switch device 1, when the operation input from the outside is no longer performed, forces generated by the self-returning function of push switches 50 are transmitted to side face portions 20 of slider 10 via pressing members 30, and slider 10 thereby moves back to the neutral position.

Multi-directional operation switch device 1 of the present embodiment is configured such that, at the time when the operation input from the outside is no longer performed, and slider 10 moves back to the neutral position, slider 10 moves back to the neutral position by utilizing the self-restoring forces of the plurality of push switches 50 instead of utilizing the self-restoring force of one push switch 50. With this configuration, slider 10 can smoothly move back to the neutral position. As used herein, the term "neutral position" refers to a position of slider 10 before multi-directional operation switch device 1 receives an operation input using fingers or the like.

Hereinafter, a detailed configuration of multi-directional operation switch device 1 will be described.

The following description will be given assuming that the four directions include first direction d1, second direction d2, third direction d3, and fourth direction d4.

First direction d1 and second direction d2 are directions that extend along first axis a1 that is orthogonal to axis a3 that passes through the neutral position of slider 10 of multi-directional operation switch device 1 in the Z axis, and face away from each other in opposite directions. Third direction d3 and fourth direction d4 are directions that extend along second axis a2 that is orthogonal to both axis a3 and first axis a1, or in other words, directions that are orthogonal to both first direction d1 and second direction d2, and face away from each other in opposite directions. Axis a3 of multi-directional operation switch device 1 is included in the neutral position of slider 10 when viewed from both a direction perpendicular to first axis a1 and a direction perpendicular to second axis a2.

In the following description, multi-directional operation switch device 1 may also be referred to as "switch device 1". All or a portion of the plurality of push switches may be referred to collectively as "push switch 50". All or a portion of the plurality of pressing members may be referred to collectively as "pressing member 30". All or a portion of the plurality of side face portions of slider 10 may be referred to collectively as "side face portion 20".

[Detailed Configuration of Multi-Directional Operation Switch Device]

A detailed configuration of multi-directional operation switch device 1 will be described with reference to FIGS. 1 to 8.

As shown in FIGS. 2 to 5, switch device 1 includes base member 80, circuit board 81, casing 60, operational member 70, slider 10, a plurality of pressing members 30, and a plurality of push switches 50. Also, switch device 1 includes panel member 74, rotation suppressing member 75, direct transmission member 76, and fixing members 82 and 83.

Base member 80 is a member that serves as the base of switch device 1, and is provided on the bottom side of switch device 1. Base member 80 directly or indirectly supports the components of switch device 1 other than base member 80.

Circuit board 81 is a board that includes a plurality of wiring lines and is provided on base member 80. The plurality of push switches 50 that are connected to the wiring lines of circuit board 81 are mounted on circuit board 81. In addition, a plurality of fixing members 82 for respectively fixing the plurality of push switches 50 and a plurality of fixing members 83 for respectively fixing the plurality of pressing members 30 are also provided on circuit board 81.

Casing 60 is provided on base member 80 and circuit board 81. Casing 60 is in the shape of a stepped case. Specifically, each of casing side wall portions 61 that are side walls of casing 60 includes first side wall portion *61h*, second side wall portion *61j* that is provided outside of first side wall portion *61h* and is provided on base member 80 side relative to first side wall portion *61h*, and shoulder portion *61i* that connects first side wall portion *61h* and second side wall portion *61j*.

Casing top surface portion 62 is stacked on one end side (in the present embodiment, the Z axis positive side) of casing side walls portion 61 (first side wall portions *61h*). For example, casing top surface portion 62 includes an engaging portion that extends toward the Z axis negative side. As a result of the engaging portion being engaged with an engaged portion formed in casing 60, casing top surface portion 62 is stacked on one end side of casing side wall portions 61 (first side wall portions 61*h*). In the present embodiment, casing top surface portion 62 is also included in casing 60.

The plurality of casing side wall portions 61 (second side wall portions 61*j*) are open on the other end side (in the present embodiment, the Z axis negative side), and are connected to base member 80. Slider 10, the plurality of pressing members 30, the plurality of push switches 50, and direct transmission member 76 are housed in an inner space of casing 60 that is surrounded by the plurality of casing side wall portions 61 and casing top surface portion 62. Also, rotation suppressing member 75 that suppresses rotation of slider 10 about axis a3 is provided in the inner space of casing 60.

Casing top surface portion 62 is provided in parallel to first axis a1 and second axis a2 so as to cover slider 10. Casing top surface portion 62 includes through hole 62*b* that extends through casing top surface portion 62 in a direction that extends along axis a3.

Casing side wall portions 61 are provided outside of pressing members 30 when viewed from slider 10. Protruding portions 61*b* for guiding the movement of pressing members 30 are provided on the inner side of first side wall portions 61*h* of casing side wall portions 61, respectively. Protruding portions 61*b* of casing side wall portions 61 will be described later.

Panel member 74 is provided on shoulder portions 61*i* of casing side wall portions 61. Panel member 74 includes, from a top surface of panel member 74, dented portion 74*a* that is dented in the direction that extends along axis a3, and through hole 74*b* that extends through panel member 74 in the direction that extends along axis a3 at the center of dented portion 74*a*. In dented portion 74*a* of panel member 74, a mark indicating a direction in which operational member 70 can move may be provided.

Operational member 70 includes disc-shaped knob 71 and cylindrical connecting member 72. Knob 71 is a member that receives an operation input using fingers or the like, and is provided on dented portion 74*a* of panel member 74. Connecting member 72 is a member for connecting operational member 70 to slider 10, and is attached to slider 10 by being passed through hole 74*b* of panel member 74 and through hole 62*b* of casing top surface portion 62.

Operational member 70 is, for example, clearance fitted in attachment hole 10*b* formed in slider 10. An operation input from the outside to operational member 70 is transmitted to slider 10 via operational member 70. In the case where knob 71 has a diameter smaller than the diameters of through holes 74*b* and 62*b*, operational member 70 and slider 10 may be configured as a single component.

Figure 6:
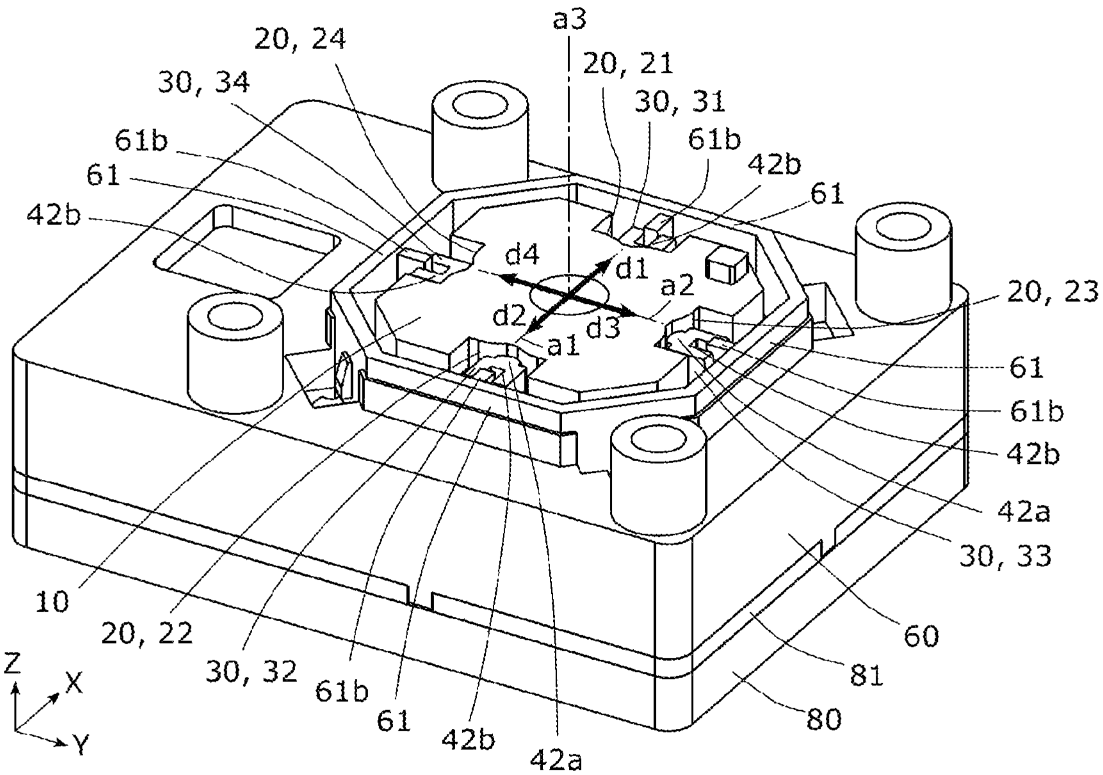
FIG. 6 is a perspective view of the slider, the pressing members, and the casing of the multi-directional operation switch device.
Figure 7:
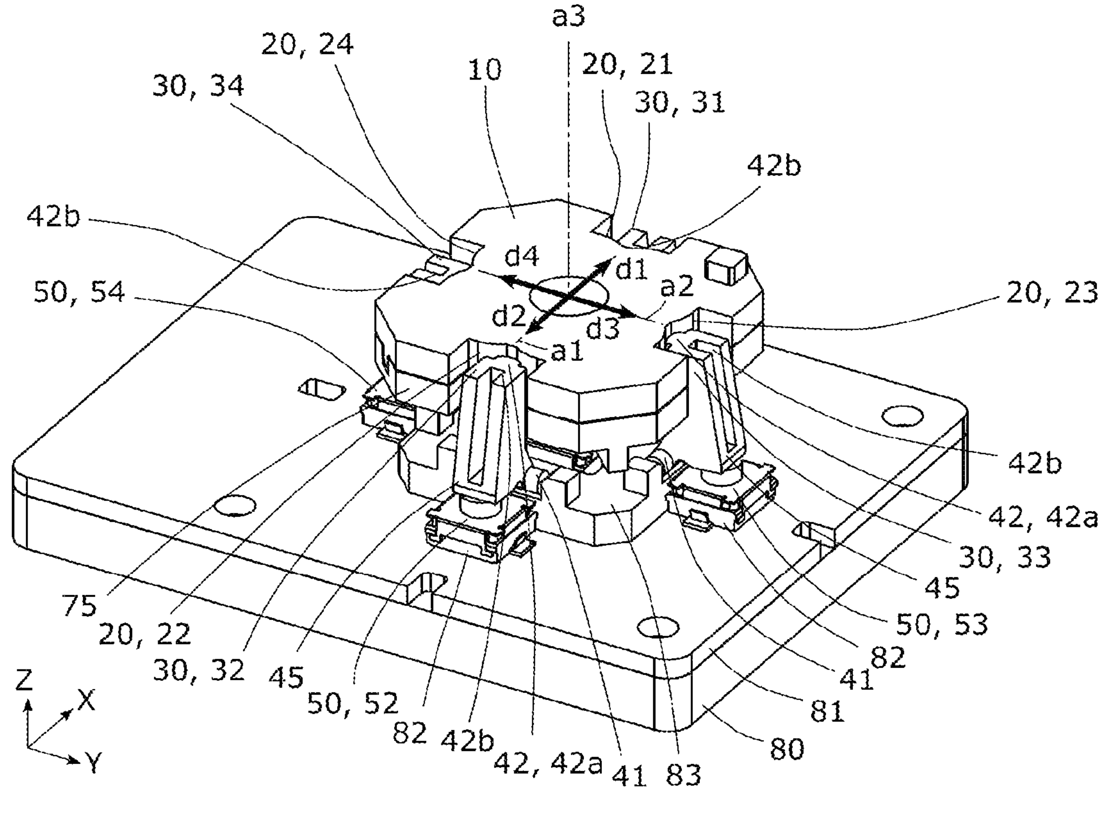
FIG. 7 is a perspective view of the slider and the pressing members of the multi-directional operation switch device.

FIG. 6 is a perspective view showing slider 10, pressing members 30, and casing 60 of multi-directional operation switch device 1. FIG. 7 is a perspective view showing slider 10 and pressing members 30 of multi-directional operation switch device 1. FIG. 6 shows switch device 1 in a state in which operational member 70, panel member 74, and casing top surface portion 62 have been removed from switch device 1 shown in FIG. 1. FIG. 7 shows switch device 1 in a state in which casing 60 has been removed from switch device 1 shown in FIG. 6.

As shown in FIGS. 5 to 7, slider 10 is provided parallel to first axis a1 and second axis a2. Slider 10 includes top surface portion 11, bottom portion 12, and a plurality of side face portions 20.

The plurality of side face portions 20 intersect first axis a1 or second axis a2, first axis a1 and second axis a2 each extending in at least one of the four directions. The plurality of side face portions 20 are composed of four side face portions including first side face portion 21, second side face portion 22, third side face portion 23, and fourth side face portion 24.

When viewed from the direction that extends along axis a3, first side face portion 21 is located in first direction d1 and intersects first axis a1. Second side face portion 22 is located in second direction d2 and intersects first axis a1. First side face portion 21 and second side face portion 22 face away from each other in opposite directions. When viewed from the direction that extends along axis a3, third side face portion 23 is located in third direction d3, and intersects second axis a2. Fourth side face portion 24 is located in fourth direction d4, and intersects second axis a2. Third side face portion 23 and fourth side face portion 24 face away from each other in opposite directions. The corners of each side face portion 20 on both sides, or in other words, each corner between two side face portions 20 bulges toward the outside.

As shown in FIG. 5, slider 10 has a rectangular shape with four beveled corners when viewed from the direction that extends along axis a3. Also, slider 10 is configured such that four sides of slider 10 in the four directions (first direction d1, second direction d2, third direction d3, and fourth direction d4) are recessed toward the center of slider 10, with each side face portion 20 being formed at a position close to the center of slider 10. With this configuration, when viewed from the direction that extends along axis a3, pressing members 30 can be provided in the recesses of slider 10, respectively, and thus multi-directional operation switch device 1 can have a compact configuration.

Each side face portion 20 includes central region Tn that is located at the center of side face portion 20 and sloped region Ts that extends toward both sides from central region Tn when viewed from the direction that extends along axis a3. Sloped region Ts is sloped so as to be closer to the center of slider 10 from both ends of side face portion 20 toward central region Tn when viewed from the direction that extends along axis a3. Sloped region Ts has a curved outer contour, and is sloped at a larger angle toward the center of slider 10. In other words, sloped region Ts is sloped so as to be away from the center of slider 10 from central region Tn toward the both ends of side face portion 20, with the slope angle being smaller as it gets away from the center of slider 10. The slope angle of sloped region Ts with respect to central region Tn is set as appropriate within a range of greater than 0° and less than 45°. As used herein, the center of slider 10 refers to a position that is an intermediate position between first side face portion 21 and second side face portion 22, and is also an intermediate position between third side face portion 23 and fourth side face portion 24.

Each side face portion 20 functions as a translation cam. For example, when slider 10 moves in a predetermined direction (any one of first direction d1 to fourth direction d4), side face portions 20 also move in the predetermined direction. Pressing member 30 that abuts against side face portion 20 that is located in the predetermined direction transforms the movement of slider 10 in the predetermined direction (the X axis direction or the Y axis direction) into a pressing direction of push switch 50 (the Z axis direction), and presses push switch 50. Also, each of pressing members 30 that abut against side face portions 20 that are located in directions that are orthogonal to the predetermined direction moves along the curve of sloped region Ts of side face portion 20, and transforms the movement along the curve of sloped region Ts in the X axis direction or the Y axis direction into the pressing direction of push switch 50 (the Z axis direction).

Figure 8:
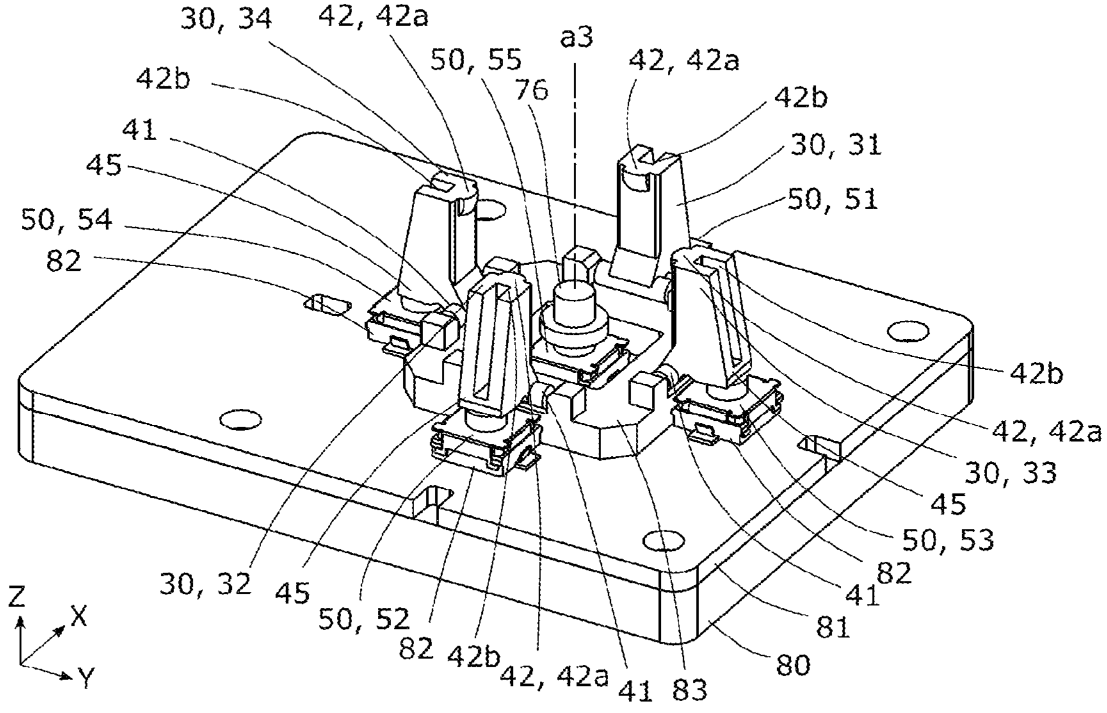
FIG. 8 is a perspective view of the pressing members and push switches of the multi-directional operation switch device.

FIG. 8 is a perspective view of pressing members 30 and push switches 50 of multi-directional operation switch device 1. FIG. 8 shows switch device 1 in a state in which slider 10 and rotation suppressing member 75 have been removed from a portion of switch device 1 shown in FIG. 7.

Switch device 1 includes, as the plurality of push switches 50, first push switch 51, second push switch 52, third push switch 53, fourth push switch 54, and fifth push switch 55.

First push switch 51 is provided in first direction d1, second push switch 52 is provided in second direction d2, third push switch 53 is provided in third direction d3, and fourth push switch 54 is provided in fourth direction d4. For example, when viewed from both the direction perpendicular to first axis a1 and the direction perpendicular to second axis a2, first push switch 51 is provided on one side of first axis a1 (in the present embodiment, the X axis positive side) with respect to axis a3, and second push switch 52 is provided on the other side of first axis a1 (in the present embodiment, the X axis negative side) with respect to axis a3. Also, third push switch 53 is provided on one side of second axis a2 (in the present embodiment, the Y axis positive side) with respect to axis a3, and fourth push switch 54 is provided on the other side of second axis a2 (in the present embodiment, the Y axis negative side) with respect to axis a3.

Fifth push switch 55 is provided on axis a3. Direct transmission member 76 is provided between fifth push switch 55 and slider 10. Fifth push switch 55 is switched to ON or OFF by a pressing force in the direction that extends along axis a3 being applied to fifth push switch 55 via slider 10 and direct transmission member 76.

Push switches 50 are, for example, self-return tactile switches, and are switched to ON or OFF by receiving a pressing force applied from the outside. Each push switch 50 includes fixed portion 57 that is connected to circuit board 81 by fixing member 82 and movable portion 58 that can be moved relative to fixed portion 57 (see FIGS. 3 and 4). Movable portion 58 moves in a direction (the Z axis direction) that is perpendicular to circuit board 81 in a state in which push switches 50 are mounted on circuit board 81. That is, movable portion 58 moves in a direction parallel to axis a3 or along axis a3. Movable portion 58 moves toward the center of fixed portion 57 by receiving a pressing force applied from the outside, and self-returns and moves to the original position when the pressing force applied from the outside is released. For example, each push switch 50 is internally provided with a diaphragm or a plate spring for moving movable portion 58 to the original position. As used herein, the term "original position" refers to a position of movable portion 58 when slider 10 is in the neutral position. The force at which movable portion 58 presses pressing member 30 is balanced at the original position, or in other words, at the neutral position of slider 10.

Each of the plurality of pressing members 30 is a member that transmits a force applied by the movement of slider 10 to movable portion 58 of a corresponding one of push switches 50. Also, each of the plurality of pressing members 30 is a member that transmits a force applied by the movement of movable portion 58 of a corresponding one of push switches 50 to a corresponding one of side face portions 20 of slider 10. For example, a force in the Z axis direction that causes movable portion 58 of push switch 50 to self-return to an off position when the pressing force applied from the outside is released is transformed into a force in the X axis direction or the Y axis direction, and transmitted to side face portion 20 of slider 10.

The plurality of pressing members 30 are composed of four pressing members 30 including first pressing member 31, second pressing member 32, third pressing member 33, and fourth pressing member 34.

First pressing member 31 is provided between first push switch 51 and slider 10, and is in contact with movable portion 58 of first push switch 51 and first side face portion 21 of slider 10. Second pressing member 32 is provided between second push switch 52 and slider 10, and is in contact with movable portion 58 of second push switch 52 and second side face portion 22 of slider 10. Third pressing member 33 is provided between third push switch 53 and slider 10, and is in contact with movable portion 58 of third push switch 53 and third side face portion 23 of slider 10. Fourth pressing member 34 is provided between fourth push switch 54 and slider 10, and is in contact with movable portion 58 of fourth push switch 54 and fourth side face portion 24 of slider 10.

The expression "a structural element is in contact with another structural element" encompasses not only the case where the structural element is in direction contact with the other structural element, but also the case where the structural element is substantially in contact with the other structural element. For example, in the case of the expression "a member is provided between pressing member 30 and push switch 50", it means that pressing member 30 and push switch 50 are substantially in contact with each other via the member. For example, in the case of the expression "a member is provided between pressing member 30 and slider 10", pressing member 30 and slider 10 are substantially in contact with each other via the member. Also, each pressing member 30 may be composed of a plurality of members, with one of the plurality of members being in contact with movable portion 58 of a corresponding one of push switches 50 and another one of the plurality of members being in contact with a corresponding one of side face portions 20 of slider 10.

Each pressing member 30 includes fulcrum portion 41, slider abutting portion 42 that is connected to fulcrum portion 41, and switch abutting portion 45 that is connected to fulcrum portion 41. Fulcrum portion 41 is rotatably supported by fixing member 83. Slider abutting portion 42 is provided adjacent to slider 10, and abuts against a corresponding one of side face portions 20 of slider 10. Switch abutting portion 45 is provided on a corresponding one of push switches 50, and abuts against movable portion 58.

Each pressing member 30 pivots about fulcrum portion 41 by a force applied from a corresponding one of side face portions 20 of slider 10 to slider abutting portion 42, and applies a pressing force to movable portion 58 via switch abutting portion 45. Also, each pressing member 30 pivots about fulcrum portion 41 by a force applied from movable portion 58 to switch abutting portion 45, and applies a pressing force to a corresponding one of side face portions 20 via slider abutting portion 42.

Slider abutting portion 42 includes protrusion 42*a* that protrudes toward axis a3 when viewed from both the direction perpendicular to first axis a1 and the direction perpendicular to second axis a2. The leading end of protrusion 42*a* is rounded, and is in contact with the corresponding one of side face portions 20 of slider 10. For example, as a result of protrusion 42*a* of slider abutting portion 42 moving along sloped region Ts of the corresponding one of side face portions 20, pressing member 30 applies a pressing force to push switch 50. Also, as a result of protrusion 42*a* of slider abutting portion 42 pressing against sloped region Ts of the corresponding one of side face portions 20 to apply a force in the sliding direction to sloped region Ts, pressing member 30 causes slider 10 to move.

Also, slider abutting portion 42 includes groove-shaped recess portion 42*b* that is recessed in a direction away from a corresponding one of casing side wall portions 61 in a rear side portion of slider abutting portion 42 that is provided in a direction opposite to the direction in which protrusion 42*a* protrudes. Each casing side wall portion 61 includes protruding portion 61*b* that is inserted into recess portion 42*b*. Protruding portion 61*b* of casing side wall portion 61 functions as a guide for guiding the movement of pressing member 30, and slider abutting portion 42 applies a pressing force to slider 10 while moving by being guided by protruding portion 61*b* of casing side wall portion 61. For example, slider abutting portion 42 slides along protruding portion 61*b*, with the movement of slider abutting portion 42 in a direction (a direction in which slider 10 moves) orthogonal to the direction in which slider abutting portion 42 applies a pressing force to slider 10 being restricted, and applies a pressing force to slider 10. Hereinafter, an operation performed by switch device 1 will be described in detail.

[Operation of Multi-Directional Operation Switch Device]

An operation performed by multi-directional operation switch device 1 will be described with reference to FIG. 9.

Figure 9:
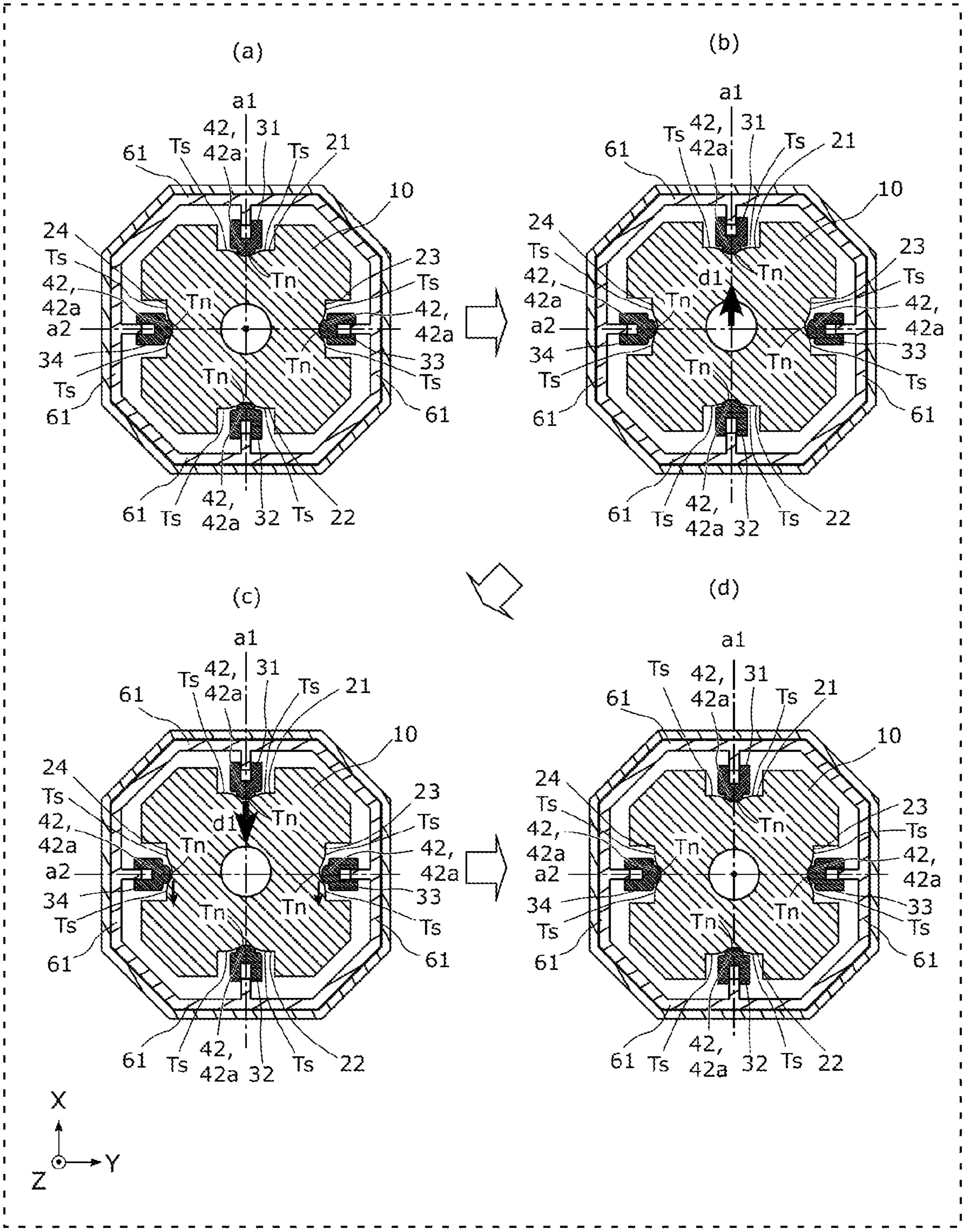
FIG. 9 is a diagram showing operations performed by the slider and the pressing members of the multi-directional operation switch device.

FIG. 9 is a diagram showing operations performed by slider 10 and pressing members 30 of multi-directional operation switch device 1. Here, an example will be described in which slider 10 moves in first direction d1. In FIG. 9, an illustration of push switches 50 is omitted.

(a) in FIG. 9 shows slider 10 when slider 10 is in the neutral position. (b) in FIG. 9 shows slider 10 when slider 10 has moved in first direction d1 based on an operation input from the outside. (c) in FIG. 9 shows slider 10 when the operation input from the outside is no longer performed. (d) in FIG. 9 shows slider 10 when slider 10 has moved back to the neutral position. In (a) and (d) in FIG. 9, protrusions 42*a* of slider abutting portions 42 are in contact with central regions Tn of third side face portion 23 and fourth side face portion 24, but, in (b) and (c) in FIG. 9, protrusions 42*a* are in contact with sloped regions Ts of third side face portion 23 and fourth side face portion 24.

As shown in (a) in FIG. 9, when switch device 1 does not receive an operation input from the outside, slider 10 is in the neutral position. When slider 10 is in the neutral position, the self-restoring forces of four push switches 51 to 54 are substantially equal. Accordingly, the pressing forces in the four directions that are applied from four push switches 51 to 54 to central regions Tn of four side face portions 21 to 24 via four pressing members 31 to 34 are substantially equal. In this state, protrusions 42*a* of pressing members 31 to 34 are in contact with central regions Tn.

As shown in (b) in FIG. 9, when slider 10 receives an operation input from the outside, and moves in first direction d1, slider abutting portion 42 of first pressing member 31 moves in first direction d1, with protrusion 42*a* abutting against central region Tn of first side face portion 21. Slider abutting portion 42 of second pressing member 32 moves in first direction d1, with protrusion 42*a* abutting against central region Tn of second side face portion 22. Protrusion 42*a* of third pressing member 33 abuts against sloped region Ts of third side face portion 23, and slider abutting portion 42 of third pressing member 33 moves in third direction d3. Protrusion 42*a* of fourth pressing member 34 abuts against sloped region Ts of fourth side face portion 24, and slider abutting portion 42 of fourth pressing member 34 moves in fourth direction d4.

Due to the pressing force from first side face portion 21 generated by the movement of slider 10, first pressing member 31 is pivoted to press first push switch 51. As a result, first push switch 51 is switched to ON or OFF. At this time, third push switch 53 is pressed by third pressing member 33 with such a force that third push switch 53 is not switched to ON or OFF (i.e., the ON or OFF state of third push switch 53 is not switched). Also, fourth push switch 54 is pressed by fourth pressing member 34 with such a force that fourth push switch 54 is not switched to ON or OFF. Also, second push switch 52 is also pressed by second pressing member 32 with such a force that second push switch 52 is not switched to ON or OFF. Furthermore, second push switch 52 is pressed by second pressing member 32 with a weak force lower than the forces applied to press third push switch 53 and fourth push switch 54.

As shown in (c) in FIG. 9, when the operation input from the outside is no longer performed, slider 10 starts moving in a direction back to the neutral position.

At this time, due to the self-restoring force of first push switch 51, first push switch 51 applies a force to first pressing member 31. Due to the force applied from first push switch 51, first pressing member 31 applies a pressing force to first side face portion 21 of slider 10. As a result, slider 10 receives, via first side face portion 21, a force that brings slider 10 back in a direction (the direction of the neutral position) opposite to first direction d1.

Also, at this time, due to the self-restoring force of third push switch 53, third push switch 53 applies a force to third pressing member 33. Due to the force applied from third push switch 53, third pressing member 33 applies a pressing force to sloped region Ts of third side face portion 23 of slider 10. Third pressing member 33 moves toward central region Tn along sloped region Ts of third side face portion 23 and applies a pressing force to slider 10.

Here, protruding portion 61*b* of casing side wall portion 61 is inserted in recess portion 42*b* of third pressing member 33, and thus the movement of third pressing member 33 in a direction that extends along first axis a1 is restricted. Accordingly, protrusion 42*a* of third pressing member 33 slides along sloped region Ts, and a force toward central region Tn is applied to slider 10. As a result, slider 10 receives, via sloped region Ts of third side face portion 23, a force that brings slider 10 back in a direction (the direction of the neutral position) opposite to first direction d1.

Also, at this time, due to the self-restoring force of fourth push switch 54, fourth push switch 54 applies a force to fourth pressing member 34. Due to the force applied from fourth push switch 54, fourth pressing member 34 applies a pressing force to sloped region Ts of fourth side face portion 24 of slider 10. Fourth pressing member 34 moves toward central region Tn along sloped region Ts of fourth side face portion 24 and applies a pressing force to slider 10.

Here, protruding portion 61*b* of casing side wall portion 61 is inserted in recess portion 42*b* of fourth pressing member 34, and thus the movement of fourth pressing member 34 in a direction that extends along first axis a1 is restricted. Accordingly, protrusion 42*a* of fourth pressing member 34 slides along sloped region Ts, and a force toward central region Tn is applied to slider 10. As a result, slider 10 receives, via sloped region Ts of fourth side face portion 24, a force that brings slider 10 back in a direction (the direction of the neutral position) opposite to first direction d1.

In the manner described above, slider 10 receives a force that brings slider 10 back in a direction opposite to first direction d1 from each of first pressing member 31, third pressing member 33, and fourth pressing member 34, and is moved to the neutral position (see (d) in FIG. 9). Slider 10 also receives a pressing force from second pressing member 32, but the pressing force applied from second pressing member 32 based on the self-restoring force of second push switch 52 is weaker than the pressing force applied from first pressing member 31. Accordingly, the force that brings slider 10 back in the direction opposite to first direction d1 is higher, and thus slider 10 is moved to the neutral position.

Switch device 1 of the present embodiment includes: slider 10 that is movable in four directions; four push switches 50; and four pressing members 30. Each of four side face portions 20 of slider 10 includes sloped region Ts that is sloped toward the center of slider 10. Each push switch 50 includes movable portion 58 that moves back to the original position when pressing is released. Each pressing member 30 is in contact with a corresponding one of movable portions 58 and a corresponding one of side face portions 20.

With this configuration, when the operation input from the outside is no longer performed, the forces applied by the movement of movable portions 58 of the plurality of push switches 50 can be applied to sloped regions Ts of the plurality of side face portions 20 of slider 10 via the plurality of pressing members 30. It is thereby possible to smoothly move slider 10 back to the neutral position.

Also, with switch device 1, slider 10 can be moved back to the neutral position by using sloped regions Ts of side face portions 20 of slider 10, and it is therefore possible to suppress an increase in the number of components of switch device 1, which was the problem in in the switch devices of the related art. Also, with switch device 1, slider 10 can be moved back to the neutral position by using sloped regions Ts of side face portions 20 of slider 10, and it is therefore possible to suppress an increase in the size of switch device 1. Also, by using, for example, self-return tactile switches as push switches 50, it is possible to obtain a clicking feel.

[Variation 1 of Embodiment]

Multi-directional operation switch device 1A according to Variation 1 of the embodiment will be described. In Variation 1, an example will be described in which multi-directional operation switch device 1A includes controller 85 that determines whether four push switches 50 have been pressed.

Figure 10:
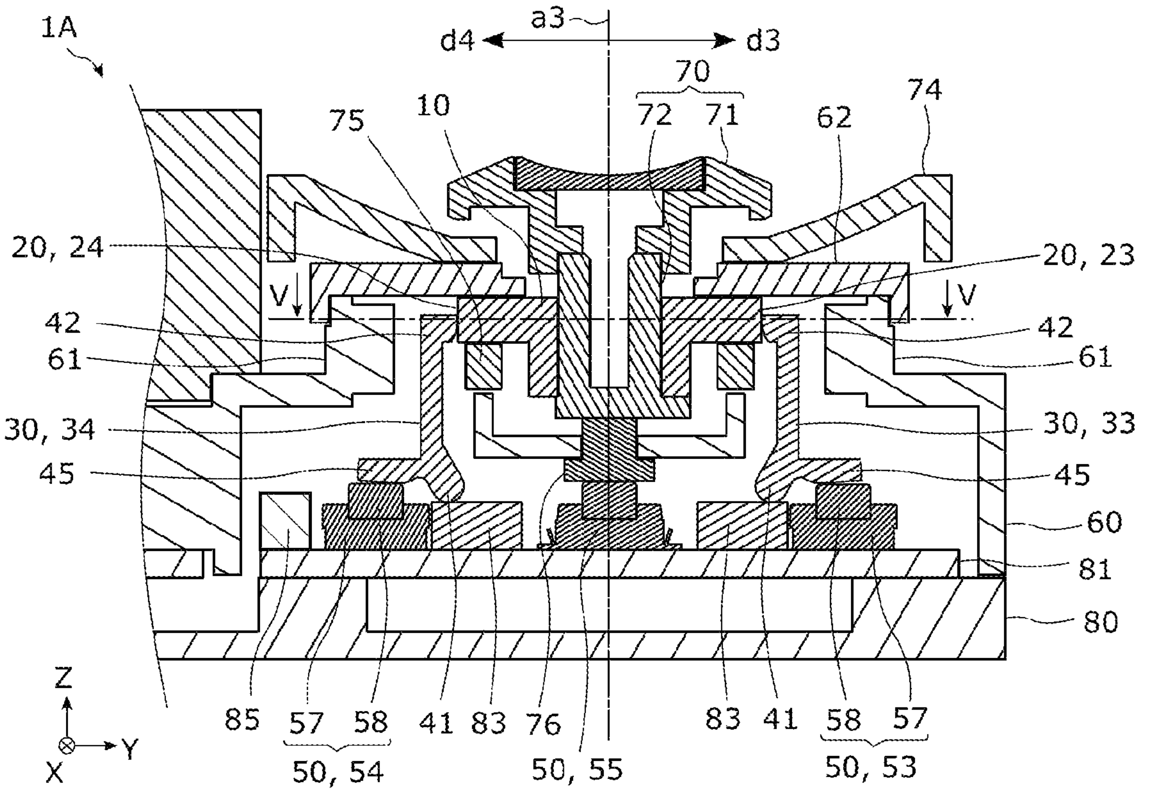
FIG. 10 is a diagram showing a multi-directional operation switch device according to Variation 1 of the embodiment.

FIG. 10 is a diagram showing multi-directional operation switch device 1A according to Variation 1 of the embodiment.

Switch device 1A of Variation 1 also includes base member 80, circuit board 81, casing 60, operational member 70, slider 10, a plurality of pressing members 30, and a plurality of push switches 50. Also, switch device 1A includes panel member 74, rotation suppressing member 75, direct transmission member 76, and fixing members 82 and 83.

For example, in multi-directional operation switch device 1A of Variation 1, sloped regions Ts of the plurality of side face portions 20 of slider 10 have a larger slope angle. Accordingly, for example, when slider 10 receives an operation input from the outside, and moves in first direction d1, protrusion 42*a* of slider abutting portion 42 of third pressing member 33 abuts against third side face portion 23, and protrusion 42*a* of slider abutting portion 42 of third pressing member 33 moves in third direction d3. At this time, sloped region Ts of third side face portion 23 has a larger slope angle, and thus the amount of movement of protrusion 42*a* in third direction d3 is large. Due to the amount of movement of protrusion 42*a* in third direction d3, third pressing member 33 pivots about fulcrum portion 41, and third push switch 53 is pressed.

Likewise, for example, when slider 10 receives an operation input from the outside, and moves in first direction d1, protrusion 42*a* slider abutting portion 42 of fourth pressing member 34 abuts against sloped region Ts of fourth side face portion 24, and slider abutting portion 42 of fourth pressing member 34 moves in fourth direction d4. At this time, sloped region Ts of fourth side face portion 24 has a larger slope angle, and thus the amount of movement of protrusion 42*a* in fourth direction d4 is large. Due to the amount of movement of protrusion 42*a* in fourth direction d4, fourth pressing member 34 pivots about fulcrum portion 41, and fourth push switch 54 is pressed.

Switch device 1A of Variation 1 includes controller 85 that determines whether four push switches 50 have been pressed. As shown in FIG. 10, controller 85 is mounted on circuit board 81. For example, if it is determined that three push switches including first push switch 51, third push switch 53, and fourth push switch 54 have been pressed, controller 85 determines that a push switch located between the three push switches (specifically, first push switch 51) has been pressed, or in other words, a switching operation has been performed to move switch device 1A in first direction d1.

With switch device 1A of Variation 1 as well, when the operation input from the outside is no longer performed, slider 10 is moved back to the neutral position by utilizing the self-restoring forces of three push switches 50 obtained via the plurality of side face portions 20. In particular, in Variation 1, the push switches (for example, third push switch 53 and fourth push switch 54) that are located at positions that are orthogonal to the direction for which the operation input from the outside was received (for example, first direction d1) are pressed to be ON. As a result, the force that smoothly brings slider 10 back to the neutral position can be increased. Also, even when the push switches (for example, third push switch 53 and fourth push switch 54) that are located at positions that are orthogonal to the direction for which the operation input from the outside was received (for example, first direction d1) are switched to ON, it is possible to determine an operated direction (a push switch that has been intentionally pressed).

[Variation 2 of Embodiment]

Multi-directional operation switch device 1A according to Variation 2 of the embodiment will be described. In Variation 2, as in Variation 1, multi-directional operation switch device 1A includes controller 85 that determines whether four push switches 50 have been pressed, and the like. In Variation 2, controller 85 is configured to be capable of outputting a signal indicating whether push switches 51 to 54 are stuck in a specific state.

In Variation 2, as in Variation 1, sloped regions Ts of the plurality of side face portions 20 of slider 10 have a larger slope angle. Accordingly, for example, when slider 10 receives an operation input from the outside, and moves in first direction d1, first push switch 51, third push switch 53 and fourth push switch 54 are pressed to be ON.

Figure 11:
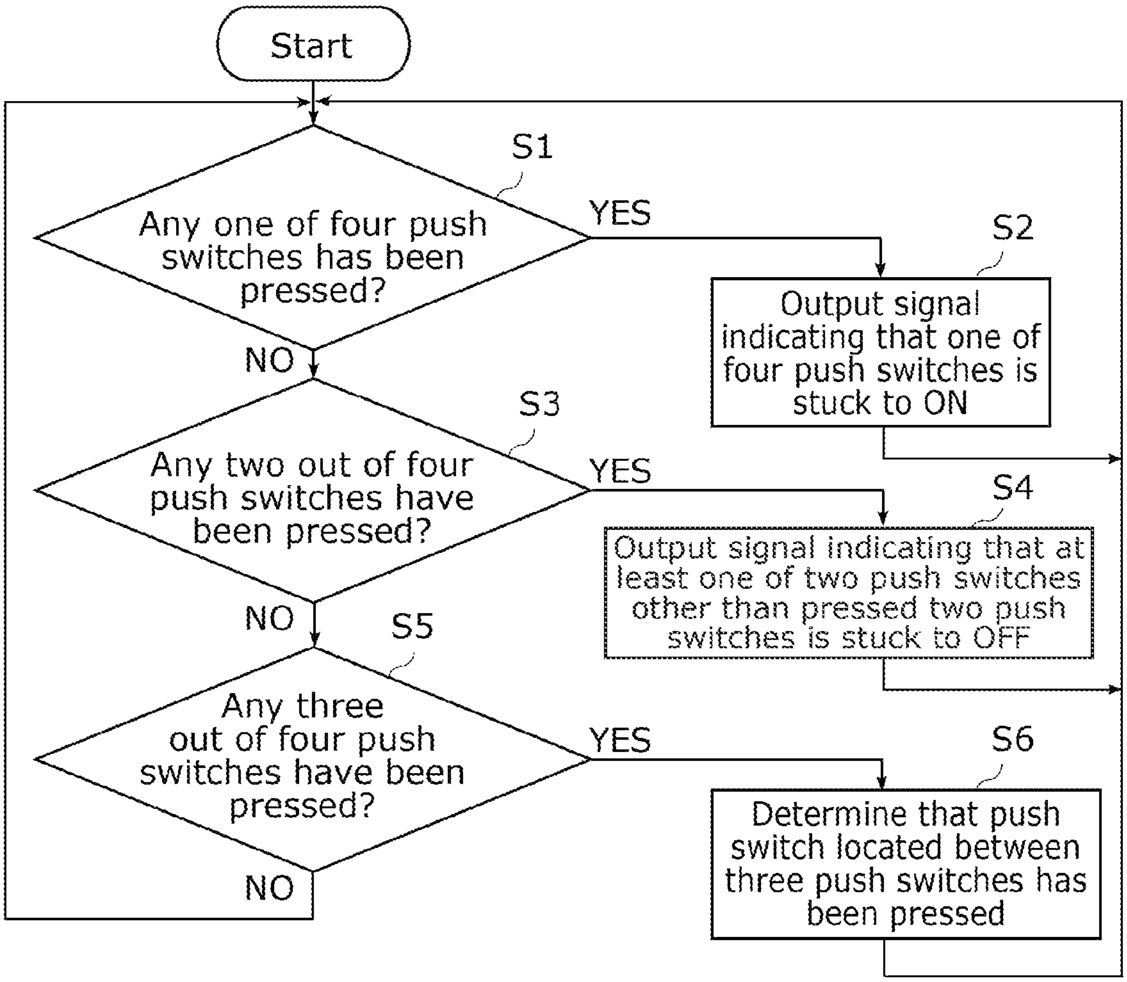
FIG. 11 is a flowchart illustrating an example of a processing operation performed by a controller according to Variation 2 of the embodiment.

FIG. 11 is a flowchart illustrating an example of a processing operation performed by controller 85 according to Variation 2 of the embodiment.

As shown in the flowchart in FIG. 11, controller 85 determines any one out of four push switches 51 to 54 has been pressed (switched to ON) (step S1).

If it is determined that any one (for example, first push switch 51) out of four push switches 51 to 54 has been pressed (YES in step S1), controller 85 outputs a signal indicating that the one of the push switches (for example, first push switch 51) is stuck to ON and cannot be switched to OFF, or in other words, a signal indicating that one of the push switches is stuck to ON (step S2). YES is determined in step S1 when, for example, slider 10 is in the neutral position, and one of four push switches 51 to 54 is stuck to ON. The signal indicating that the one of the push switches is stuck to ON is output to, for example, an in-vehicle device or an ECU (Electronic Control Unit). The in-vehicle device or the ECU that has received the signal informs the user of the fact that one of the push switches is stuck to ON. After that, controller 85 returns the processing to step S1, and continuously performs the processing of step S1 and the subsequent steps.

If it is determined that none of four push switches 51 to 54 has been pressed (NO in step S1), controller 85 determines whether any two out of four push switches 51 to 54 have been pressed (step S3).

If it is determined that any two push switches (for example, first push switch 51 and third push switch 53) have been pressed (YES in step S3), controller 85 outputs a signal indicating that at least one of two remaining push switches (for example, second push switch 52 and fourth push switch 54) other than the pressed two push switches (for example, first push switch 51 and third push switch 53) is stuck to OFF and cannot be switched to ON, or in other words, a signal indicating that at least one of two remaining push switches other than the pressed two push switches is stuck to OFF (step S4). YES is determined in step S3 when, for example, one push switch that is located in the moving direction of slider 10 is stuck to OFF, or when either one of two push switches that are located in a direction oriented at 90° relative to the moving direction of slider 10 is stuck to OFF. The signal indicating that at least one of two remaining push switches other than the pressed two push switches is stuck to OFF is output to an in-vehicle device or an ECU. The in-vehicle device or the ECU that has received the signal informs the user of the fact that at least one of two remaining push switches other than the pressed two push switches is stuck to OFF. Controller 85 returns the processing to step S1, and continuously performs the processing of step S1 and the subsequent steps.

If it is determined that any two out of four push switches 51 to 54 have not been pressed (NO in step S3), controller 85 determines whether any three out of four push switches 51 to 54 have been pressed (step S5).

If it is determined that any three out of four push switches 51 to 54 have been pressed (YES in step S5), as in Variation 1, controller 85 determines that a push switch located between the three push switches has been pressed (step S6). In other words, in this case, controller 85 determines that a switching operation has been performed to move switch device 1A in a direction of the push switch located between the three push switches. On the other hand, if it is determined that any three out of four push switches 51 to 54 have not been pressed (NO in step S5), controller 85 returns the processing to step S1, and continuously performs the processing of step S1 and the subsequent steps.

In switch device 1A of Variation 2 as well, when the operation input from the outside is no longer performed, slider 10 is moved back to the neutral position by utilizing the self-restoring forces of three push switches 50 obtained via the plurality of side face portions 20. Also, the push switches (for example, third push switch 53 and fourth push switch 54) that are located at positions that are orthogonal to the direction for which the operation input from the outside was received (for example, first direction d1) are also switched to ON. Accordingly, if it is determined that any one push switch or any two push switches have been pressed, a signal indicating that the push switch or the push switches are stuck in a specific state can be output.

Controller 85 may be configured such that, if it is determined that any one push switch is pressed for a predetermined length of time or more, controller 85 outputs a signal indicating that the push switch is stuck to ON.

Also, controller 85 may be configured such that, if it is determined that any two push switches are pressed for a predetermined length of time or more, controller 85 outputs a signal indicating that two push switches other than the pressed two push switches are stuck to OFF.

In the foregoing description, an example has been described in which step S3 is performed after step S1. However, the present disclosure is not limited thereto. For example, step S1 may be performed after step S3. Alternatively, steps S1 and S3 may be performed in parallel, and if NO is determined in both steps S1 and S3, step S5 may be performed.

Conclusion

As described above, multi-directional operation switch device 1 according to the present embodiment is a switch device that is slidable in four directions. Multi-directional operation switch device 1 includes: slider 10 that is movable in four directions; four push switches 50 that are provided in the four directions, respectively, to detect a movement of slider 10; and four pressing members 30 that are provided between slider 10 and four push switches 50. Slider 10 includes four side face portions 20, each side face portion 20 intersecting first axis a1 or second axis a2, first axis a1 and second axis a2 each extending in at least one of the four directions. Each of four side face portions 20 includes sloped region Ts that is sloped toward the center of slider 10. Each of push switches 50 includes movable portion 58 that self-returns and moves to its original position when pressing is released. Each of pressing members 30 is in contact with a corresponding one of movable portions 58 and a corresponding one of side face portions 20.

With this configuration, for example, when the operation input from the outside is no longer performed, the force applied by the movement of movable portions 58 of the plurality of push switches 50 can be applied to sloped regions Ts of the plurality of side face portions 20 of slider 10 via the plurality of pressing members 30. It is thereby possible to smoothly move slider 10 back to the neutral position.

Also, each of pressing members 30 may transmit the force applied by the movement of slider 10 to the corresponding one of movable portions 58. Alternatively, each of pressing members 30 may transmit the force applied by the movement of the corresponding one of movable portions 58 to the corresponding one of side face portions 20.

With pressing members 30 described above, push switches 50 can be switched to ON or OFF based on the movement of slider 10, and slider 10 can be moved back to the original position based on the movement of movable portions 58. As a result, multi-directional operation switch device 1 can be operated, and slider 10 can be moved back to the neutral position.

Also, each push switch 50 may apply a force to corresponding pressing member 30 due to a force of movable portion 58 moving to its original position, pressing member 30 may apply a pressing force to corresponding side face portion 20 due to the force applied from push switch 50, and slider 10 may move toward the neutral position of slider 10 by receiving the pressing force via side face portion 20.

With this configuration, slider 10 can be moved back to the neutral position by the cooperative movement of push switch 50 and pressing member 30.

Also, sloped regions Ts may be sloped at a larger angle toward the center of slider 10.

With this configuration, the force for moving slider 10 to the neutral position can be increased as slider 10 moves closer to the neutral position. It is thereby possible to smoothly move slider 10 back to the neutral position.

Also, each pressing member 30 includes switch abutting portion 45 that abuts against a corresponding one of movable portions 58, slider abutting portion 42 that abuts against a corresponding one of side face portions 20, and fulcrum portion 41 that functions as a fulcrum about which pressing member 30 pivots. Pressing member 30 may pivot about fulcrum portion 41 due to the force applied from corresponding one of movable portions 58 to switch abutting portion 45, and apply a pressing force to the corresponding one of side face portions 20 via slider abutting portion 42.

With this configuration, the force applied by the movement of movable portion 58 of each push switch 50 can be transmitted to a corresponding one of side face portions 20 of slider 10 via a corresponding one of pressing members 30. It is thereby possible to smoothly move slider 10 back to the neutral position.

Also, multi-directional operation switch device 1 further includes casing 60 at least a portion of which is located outside of pressing members 30 when viewed from slider 10. Casing 60 may include guide portions that are in contact with slider abutting portions 42, respectively, and each of slider abutting portions 42 may apply a pressing force to slider 10 while moving by being guided by a corresponding one of the guide portions.

With this configuration, it is possible to, for example, apply a pressing force to slider 10 while suppressing variations in movement of each pressing member 30. It is thereby possible to smoothly move slider 10 back to the neutral position.

Also, multi-directional operation switch device 1 further includes casing 60 that houses slider 10 and four pressing members 30. Pressing members 30 may have recess portions **42*b* that are recessed in a direction away from the side walls of casing 60, and casing 60 may have protruding portions 61*b* that are inserted into recess portions 42*b***.

With this configuration, it is possible to, for example, apply a pressing force to slider 10 while suppressing variations in movement of each pressing member 30. It is thereby possible to smoothly move slider 10 back to the neutral position.

Also, four side face portions 20 include: first side face portion 21 located in first direction d1 that is one of four directions; second side face portion 22 located in second direction d2 that is opposite to first direction d1; third side face portion 23 located in third direction d3 that is orthogonal to first direction d1; and fourth side face portion 24 located in fourth direction d4 that is opposite to third direction d3. In a state in which slider 10 has moved in first direction d1, slider 10 may receive a force that brings slider 10 back in a direction opposite to first direction d1 from pressing member 31 provided in first direction d1 via first side face portion 21, a force that brings slider 10 back in the direction opposite to first direction d1 from pressing member 33 provided in third direction d3 via sloped region Ts of third side face portion 23, and a force that brings slider 10 back in the direction opposite to first direction d1 from pressing member 34 provided in fourth direction d4 via sloped region Ts of fourth side face portion 24.

With this configuration, in addition to pressing member 31, two pressing members 33 and 34 are also used to apply a force to sloped regions Ts of third side face portion 23 and fourth side face portion 24 of slider 10, and slider 10 can be moved back in the direction opposite to first direction d1. It is thereby possible to smoothly move slider 10 back to the neutral position.

Also, four push switches 50 include: first push switch 51 provided in first direction d1 that is one of four directions; second push switch 52 provided in second direction d2 that is opposite to first direction d1; third push switch 53 provided in third direction d3 that is orthogonal to first direction d1; and fourth push switch 54 provided in fourth direction d4 that is opposite to third direction d3. Four pressing members 30 include: first pressing member 31 provided between first push switch 51 and slider 10; second pressing member 32 provided between second push switch 52 and slider 10; third pressing member 33 provided between third push switch 53 and slider 10; and fourth pressing member 34 provided between fourth push switch 54 and slider 10. In a state in which slider 10 has moved in first direction d1, slider 10 may receive a force that brings slider 10 back in a direction opposite to first direction d1 from each of first pressing member 31, third pressing member 33, and fourth pressing member 34.

With this configuration, in addition to first push switch 51, third push switch 53 and fourth push switch 54 are also used to bring slider 10 back in the direction opposite to first direction d1. It is thereby possible to smoothly move slider 10 back to the neutral position.

Also, in a state in which slider 10 has moved in first direction d1, and first push switch 51 has been switched to ON or OFF, third push switch 53 may be pressed by third pressing member 33 with such a force that third push switch 53 is not switched to ON or OFF, and fourth push switch 54 may be pressed by fourth pressing member 34 with such a force that fourth push switch 54 is not switched to ON or OFF.

With multi-directional operation switch device 1 described above, it is possible to detect the switching operation in first direction d1.

Also, multi-directional operation switch device 1A further includes controller 85 that determines whether four push switches 50 have been pressed. If it is determined that first push switch 51, third push switch 53, and fourth push switch 54 have been pressed, controller 85 may determine that a switching operation has been performed to move multi-directional operation switch device 1A in first direction d1.

With multi-directional operation switch device 1A described above, it is possible to detect the switching operation in first direction d1.

Also, controller 85 may be configured to, if it is determined that any one of first push switch 51, second push switch 52, third push switch 53, and fourth push switch 54 has been pressed, output a signal indicating that the pressed push switch is stuck to ON and cannot be switched to OFF.

With this configuration, if it is determined that any one of first push switch 51, second push switch 52, third push switch 53, and fourth push switch 54 has been pressed, controller 85 can output the signal indicating that the pressed push switch is stuck to ON and cannot be switched to OFF to, for example, an in-vehicle device.

Also, controller 85 may be configured to, if it is determined that any two out of first push switch 51, second push switch 52, third push switch 53, and fourth push switch 54 have been pressed, output a signal indicating that at least one of two remaining push switches other than the pressed two push switches is stuck to OFF and cannot be switched to ON.

With this configuration, if it is determined that any two out of first push switch 51, second push switch 52, third push switch 53, and fourth push switch 54 have been pressed, controller 85 can output the signal indicating that at least one of two remaining push switches other than the pressed two push switches is stuck to OFF and cannot be switched to ON to, for example, an in-vehicle device.

Other Embodiments

Up to here, the multi-directional operation switch devices according to the embodiment and the like of the present disclosure have been described, but the present disclosure is not limited to the embodiment and the like described above.

In the embodiment given above, an example has been described in which each slider abutting portion 42 includes recess portion 42*b*, but the present disclosure is not limited thereto. For example, each casing side wall portion 61 may include a recess portion that is recessed in a direction away from corresponding slider abutting portion 42, and each slider abutting portion 42 may include a protruding portion that is inserted into the recess portion of corresponding casing side wall portion 61. In this case, the recess portion of casing side wall portion 61 functions as a guide for guiding the movement of pressing member 30, and slider abutting portion 42 applies a pressing force to slider 10 while moving by being guided by the recess portion of casing side wall portion 61.

In FIG. 9, an example has been described in which slider 10 moves in first direction d1, but the present disclosure is not limited thereto. The same applies to the case where slider 10 moves in second direction d2, third direction d3, or fourth direction d4.

The present disclosure is not limited to the embodiment given above. Other embodiments obtained by making various modifications that can be conceived by a person having ordinary skill in the art to the above embodiment as well as embodiments constructed by combining structural elements of different embodiments without departing from the scope of the present disclosure may also be included within the scope of the one or more aspects.

While an embodiment has been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2022-013112 filed on Jan. 31, 2022, and Japanese Patent Application No. 2022-132797 filed on Aug. 23, 2022.

INDUSTRIAL APPLICABILITY

The multi-directional operation switch device according to the present disclosure is useful as a switch for an operation unit of any type of electronic devices.

The invention claimed is:

1. A multi-directional operation switch device that is slidable in four directions, the multi-directional operation switch device comprising:

a slider that is movable in the four directions;

four push switches that are provided in one-to-one correspondence with the four directions to detect a movement of the slider; and four pressing members that are each provided between the slider and a corresponding one of the four push switches, wherein the slider includes four side face portions, each side face portion intersecting a first axis or a second axis, the first axis and the second axis each extending in at least one of the four directions, each of the four side face portions includes a sloped region that is sloped toward a center of the slider, the four push switches include movable portions that are provided in one-to-one correspondence, each movable portion self-returning and moving to an original position of the movable portion when pressing is released, and each of the four pressing members is in contact with a corresponding one of the movable portions and a corresponding one of the four side face portions.

2. The multi-directional operation switch device according to claim 1, wherein each of the four pressing members transmits a force applied by the movement of the slider to the corresponding one of the movable portions, or transmits a force applied by a movement of the corresponding one of the movable portions to the corresponding one of the four side face portions.

3. The multi-directional operation switch device according to claim 1, wherein each of the four push switches applies a force to the corresponding one of the four pressing members due to a force of the corresponding one of the movable portions moving to the original position, each of the four pressing members applies a pressing force to the corresponding one of the four side face portions due to a force applied from the corresponding one of the four push switches, and the slider moves toward a neutral position of the slider by receiving the pressing force via the corresponding one of the four side face portions.

4. The multi-directional operation switch device according to claim 1, wherein the sloped region is sloped at a larger angle toward the center of the slider.

5. The multi-directional operation switch device according to claim 1, wherein each of the four pressing members includes:

a switch abutting portion that abuts against the corresponding one of the movable portions;

a slider abutting portion that abuts against the corresponding one of the four side face portions; and a fulcrum portion that serves as a fulcrum about which the pressing member pivots, and each of the four pressing members pivots about the fulcrum portion due to a force applied from the corresponding one of the movable portions to the switch abutting portion, and applies a pressing force to the corresponding one of the four side face portions via the slider abutting portion.

6. The multi-directional operation switch device according to claim 5, further comprising:

a casing at least a portion of which is located outside of the four pressing members when viewed from the slider, wherein the casing includes guide portions that are each in contact with a corresponding one of the slider abutting portions that are included in the four pressing members in one-to-one correspondence, and each of the slider abutting portions applies a pressing force to the slider while moving by being guided by a corresponding one of the guide portions.

7. The multi-directional operation switch device according to claim 1, further comprising:

a casing for housing the slider and the four pressing members, wherein the four pressing members include recess portions that are each recessed in a direction away from a side wall of the casing, the recess portions being provided in the four pressing members in one-to-one correspondence, and the casing includes protruding portions that are inserted into the recess portions.

8. The multi-directional operation switch device according to claim 1, wherein the four side face portions include:

a first side face portion located in a first direction that is one of the four directions;

a second side face portion located in a second direction that is opposite to the first direction;

a third side face portion located in a third direction that is orthogonal to the first direction; and a fourth side face portion located in a fourth direction that is opposite to the third direction, and in a state in which the slider has moved in the first direction, the slider:

receives a force that brings the slider back in a direction opposite to the first direction, from one of the four pressing members that is provided in the first direction via the first side face portion;

receives a force that brings the slider back in the direction opposite to the first direction, from one of the four pressing members that is provided in the third direction via the sloped region of the third side face portion; and receives a force that brings the slider back in the direction opposite to the first direction, from one of the four pressing members that is provided in the fourth direction via the sloped region of the fourth side face portion.

9. The multi-directional operation switch device according to claim 1, wherein the four push switches include:

a first push switch provided in a first direction that is one of the four directions;

a second push switch provided in a second direction that is opposite to the first direction;

a third push switch provided in a third direction that is orthogonal to the first direction; and a fourth push switch provided in a fourth direction that is opposite to the third direction, the four pressing members include:

a first pressing member provided between the first push switch and the slider;

a second pressing member provided between the second push switch and the slider;

a third pressing member provided between the third push switch and the slider; and a fourth pressing member provided between the fourth push switch and the slider, and in a state in which the slider has moved in the first direction, the slider receives a force that brings the slider back in a direction opposite to the first direction, from each of the first pressing member, the third pressing member, and the fourth pressing member.

10. The multi-directional operation switch device according to claim 9, wherein, in a state in which the slider has moved in the first direction, and the first push switch has been switched to ON or OFF, the third push switch is pressed by the third pressing member to an extent that the third push switch is not switched to ON or OFF, and the fourth push switch is pressed by the fourth pressing member to an extent that the fourth push switch is not switched to ON or OFF.

11. The multi-directional operation switch device according to claim 9, further comprising:

a controller that determines whether the four push switches have been pressed, wherein the controller determines that a switching operation has been performed to move the multi-directional operation switch device in the first direction when the controller determines that the first push switch, the third push switch, and the fourth push switch have been pressed.

12. The multi-directional operation switch device according to claim 11, wherein, when the controller determines that one of the first push switch, the second push switch, the third push switch, or the fourth push switch has been pressed, the controller outputs a signal indicating that the one of the first push switch, the second push switch, the third push switch, or the fourth push switch is stuck to ON and is unswitchable to OFF.

13. The multi-directional operation switch device according to claim 11, wherein, when the controller determines that two out of the first push switch, the second push switch, the third push switch, and the fourth push switch have been pressed, the controller outputs a signal indicating that at least one of two remaining push switches other than the two push switches pressed is stuck to OFF and is unswitchable to ON.

14. The multi-directional operation switch device according to claim 3, wherein the four side face portions include:

a first side face portion located in a first direction that is one of the four directions;

a second side face portion located in a second direction that is opposite to the first direction;

a third side face portion located in a third direction that is orthogonal to the first direction; and a fourth side face portion located in a fourth direction that is opposite to the third direction, in a state in which the slider has moved in the first direction, the slider:

receives a force that brings the slider back in a direction opposite to the first direction, from one of the four pressing members that is provided in the first direction via the first side face portion;

receives a force that brings the slider back in the direction opposite to the first direction, from one of the four pressing members that is provided in the third direction via the sloped region of the third side face portion; and receives a force that brings the slider back in the direction opposite to the first direction, from one of the four pressing members that is provided in the fourth direction via the sloped region of the fourth side face portion.

15. The multi-directional operation switch device according to claim 4, wherein the four side face portions include:

a first side face portion located in a first direction that is one of the four directions;

a second side face portion located in a second direction that is opposite to the first direction;

a third side face portion located in a third direction that is orthogonal to the first direction; and a fourth side face portion located in a fourth direction that is opposite to the third direction, in a state in which the slider has moved in the first direction, the slider:

receives a force that brings the slider back in a direction opposite to the first direction, from one of the four pressing members that is provided in the first direction via the first side face portion;

receives a force that brings the slider back in the direction opposite to the first direction, from one of the four pressing members that is provided in the third direction via the sloped region of the third side face portion; and receives a force that brings the slider back in the direction opposite to the first direction, from one of the four pressing members that is provided in the fourth direction via the sloped region of the fourth side face portion.

16. The multi-directional operation switch device according to claim 6, wherein the four side face portions include:

a first side face portion located in a first direction that is one of the four directions;

a second side face portion located in a second direction that is opposite to the first direction;

a third side face portion located in a third direction that is orthogonal to the first direction; and a fourth side face portion located in a fourth direction that is opposite to the third direction, in a state in which the slider has moved in the first direction, the slider:

receives a force that brings the slider back in a direction opposite to the first direction, from one of the four pressing members that is provided in the first direction via the first side face portion;

receives a force that brings the slider back in the direction opposite to the first direction, from one of the four pressing members that is provided in the third direction via the sloped region of the third side face portion; and receives a force that brings the slider back in the direction opposite to the first direction, from one of the four pressing members that is provided in the fourth direction via the sloped region of the fourth side face portion.

17. The multi-directional operation switch device according to claim 3, wherein the four push switches include:

a first push switch provided in a first direction that is one of the four directions;

a second push switch provided in a second direction that is opposite to the first direction;

a third push switch provided in a third direction that is orthogonal to the first direction; and a fourth push switch provided in a fourth direction that is opposite to the third direction, the four pressing members include:

a first pressing member provided between the first push switch and the slider;

a second pressing member provided between the second push switch and the slider;

a third pressing member provided between the third push switch and the slider; and a fourth pressing member provided between the fourth push switch and the slider, and in a state in which the slider has moved in the first direction, the slider receives a force that brings the slider back in a direction opposite to the first direction, from each of the first pressing member, the third pressing member, and the fourth pressing member.

18. The multi-directional operation switch device according to claim 4, wherein the four push switches include:

a first push switch provided in a first direction that is one of the four directions;

a second push switch provided in a second direction that is opposite to the first direction;

a third push switch provided in a third direction that is orthogonal to the first direction; and a fourth push switch provided in a fourth direction that is opposite to the third direction, the four pressing members include:

a first pressing member provided between the first push switch and the slider;

a second pressing member provided between the second push switch and the slider;

a third pressing member provided between the third push switch and the slider; and a fourth pressing member provided between the fourth push switch and the slider, and in a state in which the slider has moved in the first direction, the slider receives a force that brings the slider back in a direction opposite to the first direction, from each of the first pressing member, the third pressing member, and the fourth pressing member.

19. The multi-directional operation switch device according to claim 6, wherein the four push switches include:

a first push switch provided in a first direction that is one of the four directions;

a second push switch provided in a second direction that is opposite to the first direction;

a third push switch provided in a third direction that is orthogonal to the first direction; and a fourth push switch provided in a fourth direction that is opposite to the third direction, the four pressing members include:

a first pressing member provided between the first push switch and the slider;

a second pressing member provided between the second push switch and the slider;

a third pressing member provided between the third push switch and the slider; and a fourth pressing member provided between the fourth push switch and the slider, and in a state in which the slider has moved in the first direction, the slider receives a force that brings the slider back in a direction opposite to the first direction, from each of the first pressing member, the third pressing member, and the fourth pressing member.

20. The multi-directional operation switch device according to claim 7, wherein the four push switches include:

a first push switch provided in a first direction that is one of the four directions;

a second push switch provided in a second direction that is opposite to the first direction;

a third push switch provided in a third direction that is orthogonal to the first direction; and a fourth push switch provided in a fourth direction that is opposite to the third direction, the four pressing members include:

a first pressing member provided between the first push switch and the slider;

a second pressing member provided between the second push switch and the slider;

a third pressing member provided between the third push switch and the slider; and a fourth pressing member provided between the fourth push switch and the slider, and in a state in which the slider has moved in the first direction, the slider receives a force that brings the slider back in a direction opposite to the first direction, from each of the first pressing member, the third pressing member, and the fourth pressing member.

* * * * *